United States Patent
Downing

(10) Patent No.: US 6,806,430 B2
(45) Date of Patent: Oct. 19, 2004

(54) PATIENT LIFT AND SCALE

(75) Inventor: Fred Downing, White Bear Lake, MN (US)

(73) Assignee: EZ Way, Inc., Minneapolis, MN (US)

( * ) Notice: Subject to any disclaimer, the term of this patent is extended or adjusted under 35 U.S.C. 154(b) by 0 days.

(21) Appl. No.: 10/128,088

(22) Filed: Apr. 23, 2002

(65) Prior Publication Data

US 2002/0153176 A1 Oct. 24, 2002

Related U.S. Application Data

(60) Provisional application No. 60/285,672, filed on Apr. 23, 2001.

(51) Int. Cl.[7] .................. G01G 19/52; G01G 19/14; B66C 1/44; A61G 7/10
(52) U.S. Cl. ............ 177/144; 177/147; 177/DIG. 9; 5/83.1; 5/86.1
(58) Field of Search ................ 177/144, 147, 177/DIG. 9; 5/83.1, 86.1

(56) References Cited

U.S. PATENT DOCUMENTS

| | | |
|---|---|---|
| 2,990,899 A | 4/1961 | Bella .................. 177/139 |
| 3,338,323 A | 8/1967 | Swersey ................ 177/144 |
| 3,998,284 A | 12/1976 | James ................. 177/147 |
| 4,482,783 A | 11/1984 | Laimins ............... 177/147 |
| 4,799,562 A | 1/1989 | Burrows et al. ........ 177/229 |
| 4,926,951 A | 5/1990 | Carruth et al. ........ 177/144 |
| 5,022,106 A | 6/1991 | Richards ............... 5/86 |
| 5,033,563 A | 7/1991 | Brainerd, Jr. et al. .. 177/132 |
| 5,174,399 A | 12/1992 | Brauneis .............. 177/25.15 |
| 5,319,817 A * | 6/1994 | Hay et al. ............ 177/144 |
| 5,823,278 A * | 10/1998 | Geringer .............. 177/144 |
| 5,859,390 A * | 1/1999 | Stafford et al. ....... 177/144 |
| 5,892,180 A | 4/1999 | Carey ................. 177/144 |
| 5,906,016 A | 5/1999 | Ferrand et al. ........ 5/600 |
| 6,201,195 B1 | 3/2001 | Carey ................. 177/144 |

* cited by examiner

Primary Examiner—Randy Gibson
(74) Attorney, Agent, or Firm—Banner & Witcoff, Ltd.

(57) ABSTRACT

An apparatus for weighing a person having an inner mast attached to a base and an outer mast slidably disposed over the inner mast. A platform is attached to the outer mast wherein the platform accepts the feet of the person. The apparatus includes a load cell attached to the inner and outer mast proximate the top end of the outer mast such that when the person stands on the platform the platform transfers the weight of the person from the outer mast to the load cell such that the person's weight can be determined.

20 Claims, 4 Drawing Sheets

PATENT LIFT AND SCALE

CROSS-REFERENCE TO RELATED APPLICATION(S)

This application claims the benefit of U.S. Provisional Patent Application No. 60/285,672, filed Apr. 23, 2001.

BACKGROUND OF THE INVENTION

The present invention generally relates to the health care field. More particularly, the present invention relates to an apparatus for lifting and weighing a patient.

Prior to the introduction of patient lifts into the health care industry, personnel were required to manually lift patients from a prone or seated position to a standing position. In order to lift the patient, the health care provider would have to bend over and lift the patient. This movement creates a great deal of stress and torque on the back of the health care provider. The stress and torque on the healthcare provider's back has caused numerous muscular and skeletal injuries which resulted in lost time and possibly worker's compensation claims.

The introduction of personal lifting systems have greatly reduced injuries to individuals that are unable to rise from a seated or prone position. Instead of the health care provider lifting the patient, the personal lifting system provides a mechanical lifting force which raises the patient thereby eliminating the stress and torque on the back of the health care provider.

Besides reducing the risk of injury to the health care provider, the personal lifting system reduces the risk of injury to the patient. When a patient is manually lifted by a health care provider, there is a risk of the patient being dropped or falling which likely results in an injury to the patient. The lifting device provides a mechanically controlled lift which eliminates most of the risk to the patient during a lift.

BRIEF SUMMARY OF THE INVENTION

The present invention includes an apparatus for weighing a person having an inner mast attached to a base. An outer mast is slidably disposed over the inner mast. A platform is attached to the outer mast wherein the platform accepts the feet of the person. The apparatus includes a load cell attached to the inner and outer mast. When the person stands on the platform, the weight of the person is transferred from the outer mast to the load cell such that the person's weight can be determined.

DETAILED DESCRIPTION

Figure 1:
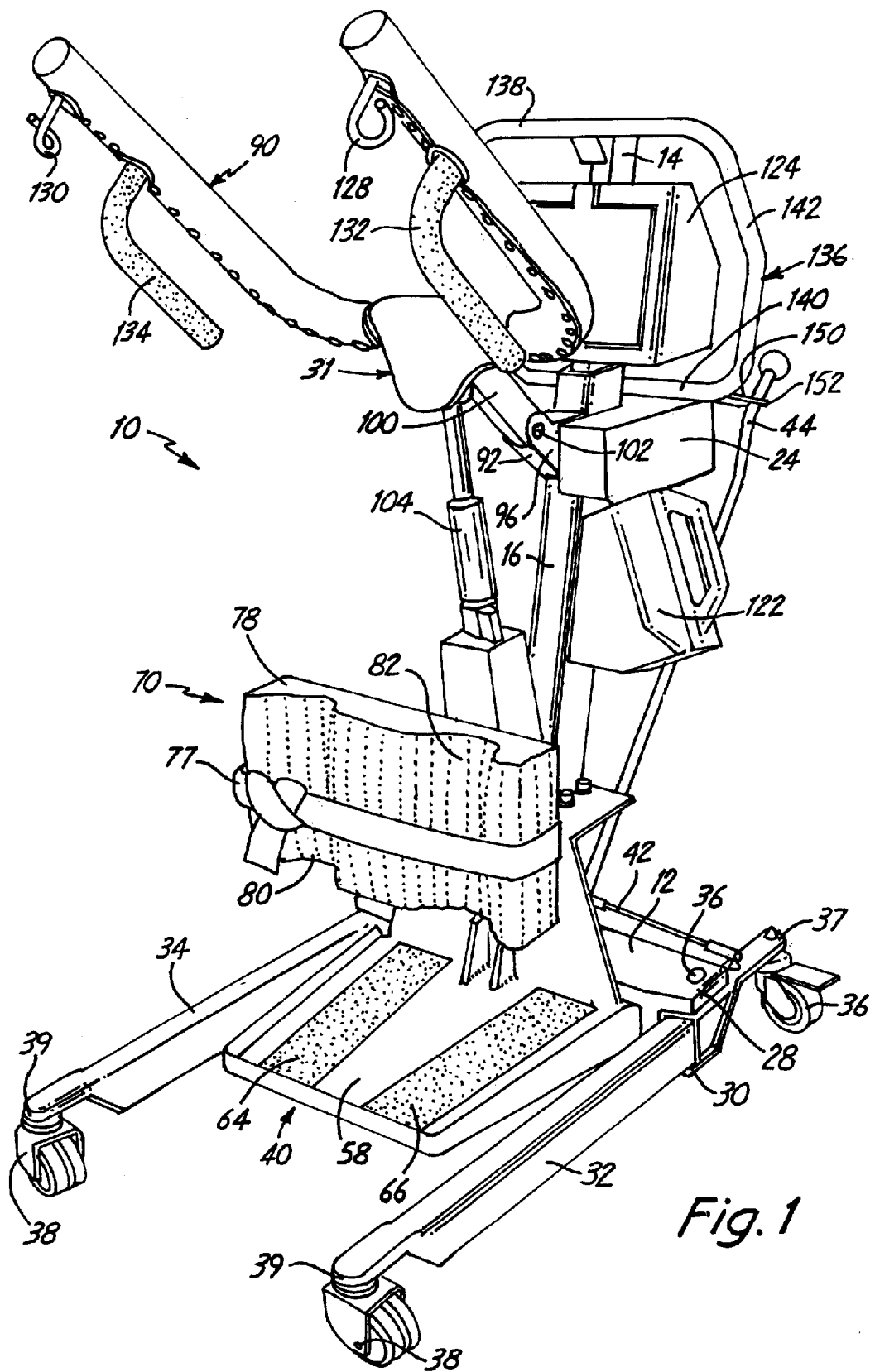
FIG. 1 is a perspective view of the lift and scale device of the present invention.
Figure 2:
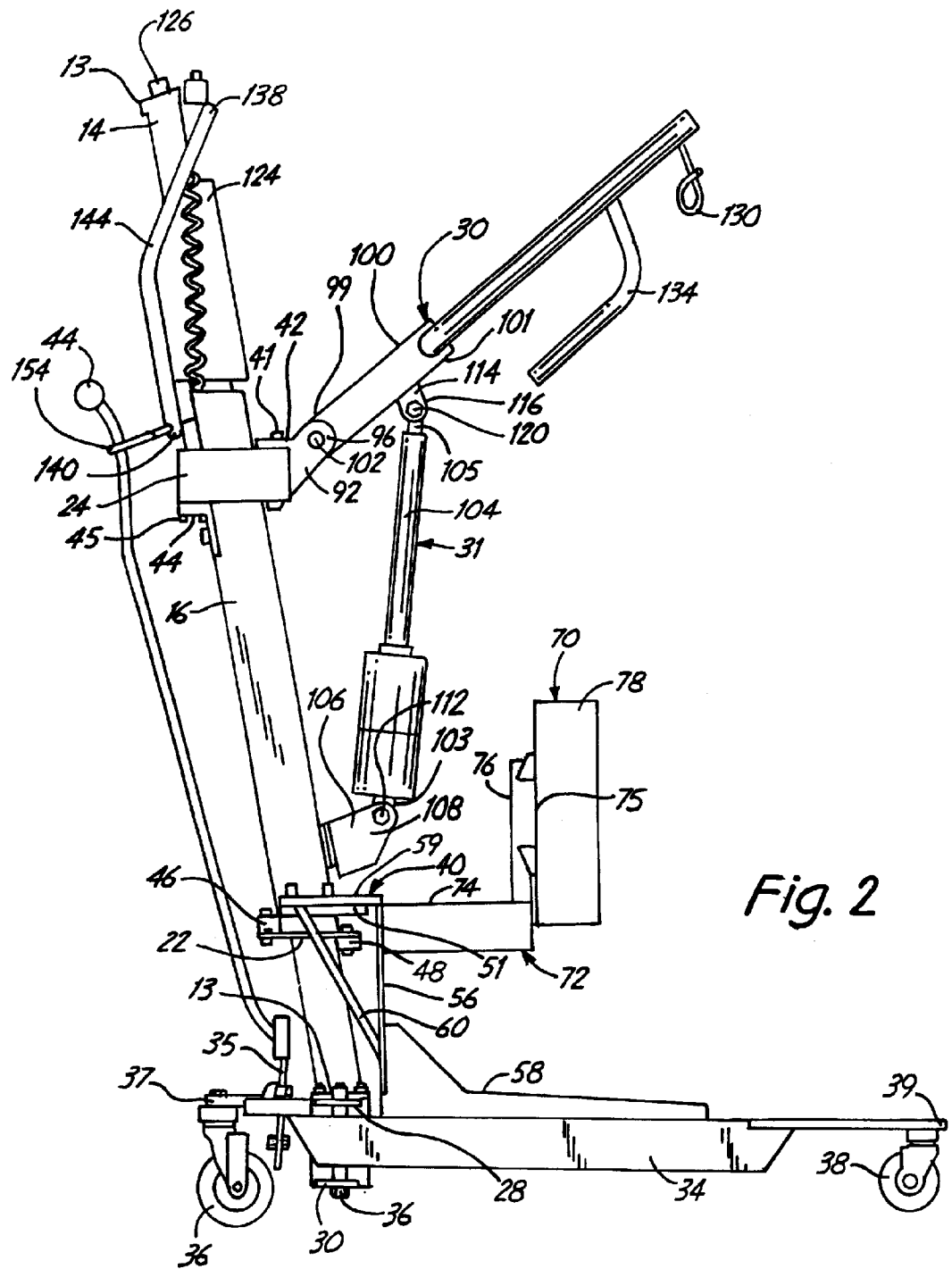
FIG. 2 is a side view of the lift and scale device of the present invention.
Figure 3:
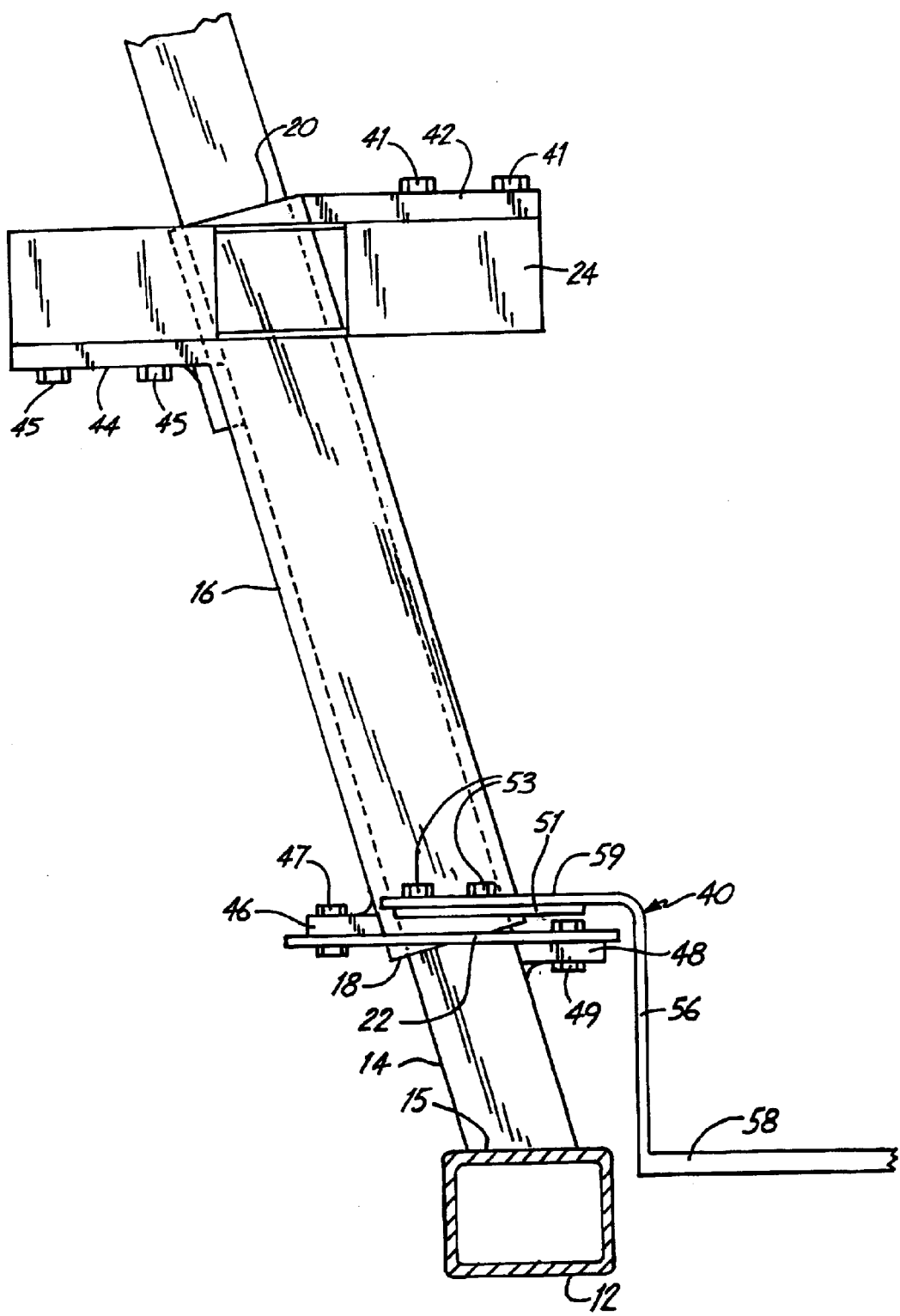
FIG. 3 is a side elevation view of the inner and outer masts of the present invention.

A lift and scale device of the present invention is generally illustrated in FIG. 1 at 10. The lift and scale device 10 includes an outer mast 16 disposed over an inner mast 14 wherein the inner mast 14 is attached to a base 12 as best illustrated in FIGS. 2 and 3. A foot platform 40 for a person to position his/her feet is fixedly attached to the outer mast 16. Referring to FIGS. 1 and 2, a lifting mechanism 31 is attached to an outer mast 16 where the lifting mechanism 31 is used to raise the patient to standing position. A load cell 24 attaches the inner and outer masts 14, 16 proximate a top end 20 of the outer mast 16. The weight of the patient is transferred from the foot platform 40 and the lifting mechanism 31 to the outer mast 16 which places a load on the load cell 24 such that the weight of the patient can be determined.

Figure 4:
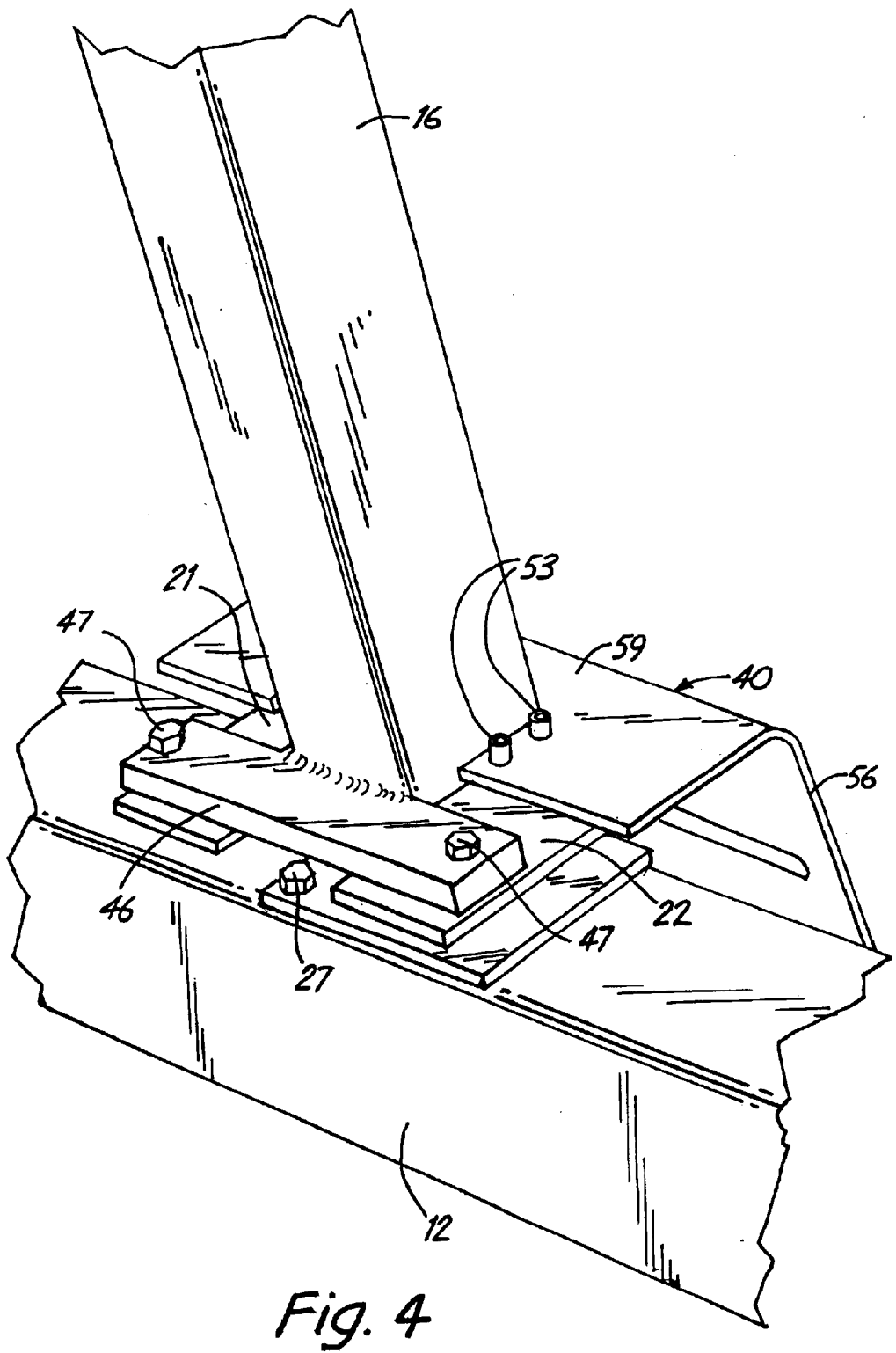
FIG. 4 is a partial perspective view of the base and inner and outer masts of the present invention.

Referring to FIGS. 3 and 4, a pair of flexure plates 21, 22 connect the inner and outer masts 14, 16 proximate a bottom end 18 of the outer mast 16. The flexure plates 21, 22 allow the outer mast 16 to float substantially vertically about the inner mast 14 and thereby allow the weight of the patient to be transferred from the outer mast 16 to the load cell 24 such that the weight of the patient can be accurately measured. The flexure plates 21, 22 are preferably constructed from an aluminum plate wherein the aluminum plate is a thickness which easily flexes while maintaining the outer mast 16 in alignment about the inner mast 14. Although flexure plates are preferred in maintaining the alignment of the outer mast 16 about the inner mast 14, those skilled in the art will recognize that other alignment mechanisms are within the scope of the invention including, but not limited to, rollers between the inner and outer masts 14, 16 and shafts in either mast cooperating with slots in the other mast.

The inner mast 14 is substantially centrally located on and vertically slanted away from the base 12. A bottom end 15 of the inner mast 14 is fixedly attached to the base 12, preferably by a plurality of bolts 27, one of which is illustrated in FIG. 4.

The base 12 preferably is made of steel tube stock having a square or rectangular cross-section although other materials and cross-sectional geometries are within the scope of the invention. Extending from the ends of top and bottom surfaces of the base 12 are upper and lower tabs 28, 30, as best illustrated in FIGS. 1 and 2, which have aligned through holes (not shown).

First and second legs 32, 34 are pivotally attached to the first and second ends of the base 12 by 36. The first and second legs 32, 34 each have a caster 36 pivotally attached to a front end 37 and a pair of casters 38 attached to a back end 39.

First ends of first and second linkage rods, one of which is illustrated in FIG. 1 at 42, are pivotally attached to the first and second legs 32, 34 respectively. Second ends of the first and second linkage rods 42 are attached to a pivot bar 35 as illustrated in FIG. 2. The pivot bar 35 is attached to a handle 44 which is positionable into three positions. The handle 44 is positioned into a first position wherein the back ends 39 of the first and second legs 32, 34 are spread apart further than the front ends 37, a middle position wherein the distances between the back ends 39 and the front ends 37 are equal and a third position wherein the front ends 37 are spaced apart further than the back ends 39. The ability to adjust the position of the first and second legs 32, 34 is important in maneuvering the lift and scale device 10 into tight spaces.

The outer mast 16 is constructed of a steel tube stock having a complimentary cross-sectional configuration to the inner mast 14 such that the outer mast 16 is slidably disposed over the inner mast. The outer mast 16 preferably has a square or rectangular cross-sectional configuration and is shorter in length than the inner mast 14 such that the top and bottom ends 13, 15 of the inner mast 14 are exposed.

Referring to FIGS. 2 and 3, the load cell 24 attaches the outer mast 16 to the inner mast 14 proximate the upper end 20 of the outer mast 16. A first end of a first connecting bracket 42 is attached to the outer mast 16, preferably with a weld. A second end of the first connecting bracket 42 is attached to a top surface of the load cell 24 at a first end, preferably with bolts 41. A first end of a second connecting bracket 44 is attached to the inner mast 14 through a cut out portion of the outer mast 16, preferably with a weld. A second end of the second connecting bracket 44 is attached to a bottom surface at a second end of the load cell 24, preferably with bolts 45.

Referring to FIGS. 3 and 4, the lower end 18 of the outer mast 16 is operably connected to the inner mast 14 by the first and second flexure plates 21, 22. First ends of the flexure plates 21, 22 are attached to a first mounting bracket 46, preferably with bolts 47, where the first mounting bracket 46 is attached to the inner mast 14, preferably by a weld. Second ends of the flexure plates 21, 22 are attached to a second mounting bracket 48, preferably with bolts 49, where the second mounting bracket 48 is attached to the outer mast 16, preferably by a weld.

A footplate mounting bracket 51 is attached to the outer mast 16, preferably by a weld. The foot platform 40 is attached to the footplate mounting bracket 51 preferably by a plurality of bolts 53. The foot platform 40 includes a flat upper portion 59 having a cut out that has a complimentary configuration to the outer mast 16. Extending downward from the flat upper portion 59 is a vertical portion 56. A standing platform 58 is attached to a bottom end of the vertical portion 56. First and second angled brace members, one of which is illustrated in FIG. 2 at 60, are disposed on opposite sides of the of the foot platform 40. The first and second brace members 60 (not shown) prevent the vertical portion 56 from flexing when a patient positions his/her feet of the foot platform 40 and is lifted. Preferably, the foot platform 40 includes first and second traction strips 64, 66 which prevent the patient's feet from slipping on the foot platform 40, as best illustrated in FIG. 1.

Referring to FIG. 2, a shin pad assembly 70 is attached to the vertical portion 56 of the foot platform 40 proximate a top end thereof by a mounting bracket 72. The mounting bracket 72 includes a horizontal portion 74 attached to the vertical portion 75 in a substantially perpendicular relationship and preferably by a weld. A metal plate 75 is attached to the vertical portion 76 where a shin pad 78 is attached to the metal plate 76, preferably by bolts or screws (not shown).

Referring to FIG. 1, the shin pad 78 includes first and second indentions 80, 82 to better accept the shins of the patient. A retaining strap 77 is attached to the shin pad assembly 70 to retain the patient's shins proximate the shin pad 78.

Referring to FIGS. 1 and 2, the lifting mechanism 31 includes a Y-shaped yoke 90 pivotally attached to the outer mast 16 by a mounting bracket 92 extending from the first connecting bracket 42. The mounting bracket 92 has spaced apart side walls 96 having aligned apertures (not shown). A distal end 99 of a stem portion 100 of the Y-shaped yoke 90 is disposed between the spaced apart side walls. The stem portion 100 includes a through bore at the distal end 99. A pin 102 is inserted through the aligned apertures (not shown) and the through bore (not shown) to pivotally attach the stem portion 100 of the Y-shaped yoke 90 to the mounting bracket 92.

An electric powered actuator 104 is pivotally attached to both the outer mast 16 and the stem portion 100 of the yoke 90 proximate a proximal end 101. A first actuator mounting bracket 106 is welded to the outer mast 16 proximate the footplate mount stand 51, the bracket 106 having spaced apart sidewalls 108 and aligned apertures (not shown) therethrough. A first end 103 of the actuator 104 is disposed between the spaced apart side walls 108 such that a through bore (not shown) proximate the first end 103 is aligned with the aligned apertures (not shown) in the spaced apart side walls 108. A pin 112 is disposed through the aligned apertures (not shown) and the through bore (not shown) to pivotally attach the first end 103 of the actuator 104 to the outer mast 16. Although preferred embodiment employs a single actuator, one skilled in the art will recognize that multiple actuators are within the scope of the invention to accommodate lifting larger persons.

A second actuator mounting bracket 114 is attached to the stem portion 100 of the Y-shaped yoke 90 proximate the proximal end 101. The second actuator mounting bracket 114 includes spaced apart sidewalls 116 having aligned apertures (not shown). The actuator 104 includes a second through bore (not shown) proximate a second end 105. The second end 105 of the actuator 104 is disposed between the spaced apart side walls 116 such that the second through bore (not shown) is aligned with the aligned apertures (not shown) in the spaced apart side walls 116. A second pin 120 is inserted through the aligned apertures (not shown) and the second through bore (not shown) to pivotally attach the actuator 104 to the stem portion 100 of the Y-shaped yoke 90.

Referring to FIG. 1, a battery 122 attached to a side surface of the outer mast 16. The battery 122 supplies power to a control panel 124. The control panel 124 includes buttons to zero out the scale and to control the position of the yoke 90.

The load cell 24 is wired to the control panel 124 such that a weight of the patient is digitally displayed. An emergency stop button 126 is located on the top of the inner mast 14 to stop the actuator 104 from moving in the event of an emergency as illustrated in FIG. 2.

Referring to FIGS. 1 and 2, first and second safety hooks 128, 130 are attached to the Y-shaped yoke 90 proximate the ends. Curved handles 132, 134 are attached to the Y-shaped yoke 90 wherein the curved handles 132, 134 provide stability to the patient during a lift. To better assist the patient in gripping the handles, the handles 132, 134 are preferably covered with a foam coating. Preferably, a protective pad is disposed over the Y-shaped yoke 90 to protect the patient and the health care provider.

A towing handle 136 is attached to the inner mast 14 at a top and bottom end. The towing handle 136 also includes first and second outer vertical bars 142, 144 wherein the ends of the bars 142, 144 are attached to the top and bottom cross members 138, 140. The vertical bars 142, 144 are slightly bent to provide a better gripping surface for the health care provider.

Referring to FIGS. 1 and 2, a wire holder 150 for retaining the handle 44 is attached to the bottom cross member 140 where the wire holder 150 attaches to each end of the bottom cross member 140. The wire holder 150 includes three notches, a first notch 152 at one end, a second notch 154 at the other end and a third notch (not shown) therebetween which accept and retain the handle 44 in one of the three positions.

The lift and scale 10 of the present invention also preferably includes a cowling (not shown) that is disposed over the flexure plates 21, 22 and about the inner and outer masts 14, 16. The cowling (not shown) protects the flexure plates 21, 22 and also protects the health care provider and the patient.

In operation, the lift and scale device 10 is positioned proximate a patient to be lifted. The health care provider lowers the Y-shaped yoke 90 by manipulating the actuator 104 with the control panel 124. The health care provider zeroes out the scale 10 with the control panel 124 such that the weight of the patient can be determined.

A support strap (not shown) is positioned about the patient's upper back and under the arms. Ends of the support strap are secured to the first and second safety hooks 128, 130. The patient grasps the curved handles 132, 134 and positions his/her feet on the traction strips 64, 66 on the foot plate platform 58 and the strap 77 may be secured about the patient's lower legs. The health care provider manipulates the actuator 104 to raise the Y-shaped yoke 90. As the yoke is raised, the flexure plates 21, 22 flex thereby allowing the outer mast 16 to float over the inner mast 14 such that the weight of the patient is transferred to the load cell 24 by the outer mast 16. A signal from the load cell 24 is transmitted to the control panel 124. The control panel 124 converts the signal from the load cell 24 to the weight of the patient. The lift and scale device 10 of the present invention safely lifts and weighs the patient without risking injury to either the patient or health care provider during the lift.

Once the patient is standing on the lift and scale device 10 of the present invention, the support strap (not shown) and the securing strap 77 are removed and the patient can step off of the lift and scale device 10 and begin walking. Alternatively, if the patient wants to be seated, the yoke is lowered by manipulating the actuator 104 with the control panel 124, thereby safely lowering the patient without the risk of injury to the patient or the health care provider.

Although the present invention has been described with reference to preferred embodiments, workers skilled in the art will recognize that changes may be made in form and detail without departing from the spirit and scope of the invention.

What is claimed is:

1. An apparatus for weighing a person, the apparatus comprising:
    a base;
    an inner mast attached to the base;
    an outer mast disposed about the inner mast and slidable thereover;
    a platform attached to the outer mast; and
    a load cell attached to the inner mast and the outer mast such that when the person stands on the platform and the person's weight is transferred to the load cell from the outer mast so that the person's weight is determinable.

2. The apparatus of claim 1 and further comprising a first mounting bracket attached to the inner mast wherein the first mounting bracket attaches to a first end of the load cell.

3. The apparatus of claim 1 and further comprising a second mounting bracket attached to the outer mast wherein the second mounting bracket attaches to a second end of the load cell.

4. The apparatus of claim 1 and further comprising a control panel, the control panel in communication with the load cell.

5. The apparatus of claim 1 and further comprising a lifting mechanism attached to the outer mast wherein the lifting mechanism assists the person to stand on the platform.

6. The apparatus of claim 5 wherein the lifting mechanism comprises:
    a yoke pivotally attached to the outer mast; and
    an actuator pivotally attached to the yoke.

7. The apparatus of claim 6 and further comprising a communication between a control panel and the actuator wherein the control panel manipulates the position of the yoke with the actuator.

8. The apparatus of claim 1 and further comprising an alignment mechanism cooperating with the inner and outer masts to maintain the alignment of the outer mast about the inner mast.

9. The apparatus of claim 8 wherein the alignment mechanism comprises at least one flexure plate connecting the outer mast and the inner mast proximate the bottom end of the outer mast.

10. The apparatus of claim 8 wherein alignment mechanism comprises first and second flexure plates disposed along opposite sides of the outer mast.

11. The apparatus of claim 10 and further comprising:
    a first mounting support attached to the outer mast wherein first ends of the first and second flexure plates are attached thereto; and
    a second mounting support attached to the inner mast wherein second ends of the first and second flexure plates are attached thereto.

12. An apparatus for lifting and weighing a person, the apparatus comprising:
    a base;
    an inner mast attached to the base;
    an outer mast disposed about the inner mast and moveable thereover;
    an alignment mechanism cooperating with the inner and outer masts to maintain the alignment of the outer mast about the inner mast;
    a platform attached to the outer mast;
    a lifting mechanism attached to the outer mast above the platform wherein the lifting mechanism assists the person to stand on the platform; and
    a load cell attached to the inner mast and the outer mast wherein the person, with the assistance of the lifting mechanism, stands on the platform such that the weight of the person is transferred to the load cell from the outer mast thereby measuring the weight of the person.

13. The apparatus of claim 12 and further comprising a first mounting bracket attached to the inner mast wherein the first mounting bracket attaches to the a first end of the load cell.

14. The apparatus of claim 12 and further comprising a second mounting bracket attached to the outer mast wherein the second mounting bracket attaches to a second end of the load cell.

15. The apparatus of claim 12 and further comprising a control panel, the control panel in communication with the load cell.

16. The apparatus of claim 12 wherein the lifting mechanism comprises:
    a yoke pivotally attached to the outer mast; and
    an actuator pivotally attached to the yoke.

17. The apparatus of claim 16 and further comprising a communication between a control panel and the actuator wherein the control panel manipulates the position of the yoke with the actuator.

18. The apparatus of claim 12 wherein the alignment mechanism comprises at least one flexure plate connecting the outer mast and the inner mast proximate the bottom end of the outer mast.

19. The apparatus of claim 12 wherein the alignment mechanism comprises first and second flexure plates disposed along opposite sides of the outer mast.

20. An apparatus for lifting and weighing a person, the apparatus comprising:
    a base;
    an inner mast attached to the base;
    a first mounting bracket fixedly attached to the inner mast proximate a top end;
    an outer mast having a top end and a bottom end, the outer mast disposed about the inner mast and moveable thereover;

a second mounting bracket fixedly attached to the outer mast proximate the top end;

first and second flexure plates connecting the inner mast and the outer mast proximate a bottom end of the outer mast;

a platform attached to the outer mast proximate a bottom end;

a lifting mechanism attached to the outer mast wherein the lifting mechanism assists the person to stand on the platform; and a load cell having a first end and a second end wherein the first end is attached to the first mounting bracket and the second end is attached to the second mounting bracket wherein the person, with the assistance of the lifting mechanism, stands on the platform such that the weight of the person is transferred from the outer mast to the load cell thereby allowing the weight of the person to be measured.

* * * * *